US009501465B2

(12) United States Patent
Michael et al.

(10) Patent No.: US 9,501,465 B2
(45) Date of Patent: Nov. 22, 2016

(54) USE OF TEMPLATES AS MESSAGE PRUNING SCHEMAS

(75) Inventors: Constantinos Michael, New York, NY (US); Steffen Meschkat, Zurich (CH); Tobias Boonstoppel, New York, NY (US); Stefan Haustein, Zurich (CH)

(73) Assignee: Google Inc., Mountain View, CA (US)

( * ) Notice: Subject to any disclaimer, the term of this patent is extended or adjusted under 35 U.S.C. 154(b) by 1082 days.

(21) Appl. No.: 13/245,831

(22) Filed: Sep. 26, 2011

(65) Prior Publication Data

US 2015/0169651 A1  Jun. 18, 2015

(51) Int. Cl.
G06F 17/30 (2006.01)
G06F 17/24 (2006.01)
G06F 17/27 (2006.01)
H04L 29/08 (2006.01)

(52) U.S. Cl.
CPC .......... *G06F 17/248* (2013.01); *G06F 17/272* (2013.01); *G06F 17/30902* (2013.01); *H04L 67/02* (2013.01)

(58) Field of Classification Search
USPC ....... 707/791, 792, 793, 796, 802, 803, 804, 707/807, 809, E17.001, E17.002, E17.005, 707/E17.044, 999.1, 999.101, 999.103, 707/999.104, 999.105, 999.107
See application file for complete search history.

(56) References Cited

U.S. PATENT DOCUMENTS

| 6,263,352 | B1 | 7/2001 | Cohen |
| 6,738,804 | B1 | 5/2004 | Lo |
| 6,938,205 | B1 | 8/2005 | Hanson et al. |
| 6,981,212 | B1 | 12/2005 | Claussen et al. |
| 7,640,512 | B1 | 12/2009 | Appling |
| 7,685,609 | B1 | 3/2010 | McLellan |
| 7,698,321 | B2 | 4/2010 | Hackworth |
| 7,844,894 | B2 | 11/2010 | Khopkar et al. |
| 7,958,232 | B1 | 6/2011 | Colton et al. |
| 2004/0111671 | A1 | 6/2004 | Lu et al. |
| 2004/0187080 | A1 | 9/2004 | Brooke et al. |
| 2004/0199497 | A1 | 10/2004 | Timmons |
| 2005/0060317 | A1* | 3/2005 | Lott et al. ........................ 707/10 |
| 2005/0289178 | A1 | 12/2005 | Angus |
| 2006/0107206 | A1* | 5/2006 | Koskimies .................... 715/523 |
| 2006/0212804 | A1 | 9/2006 | Jackson et al. |
| 2006/0242575 | A1 | 10/2006 | Winser |
| 2007/0033280 | A1* | 2/2007 | Popp et al. ................... 709/224 |
| 2007/0050407 | A1* | 3/2007 | Chen et al. ................. 707/104.1 |
| 2007/0078810 | A1 | 4/2007 | Hackworth |
| 2007/0233902 | A1 | 10/2007 | Trefler et al. |
| 2008/0028302 | A1 | 1/2008 | Meschkat |
| 2008/0040653 | A1 | 2/2008 | Levine |

(Continued)

OTHER PUBLICATIONS

"An Evaluation of Protocol Buffer", Kaur, Mar. 2010, pp. 459-462.*

(Continued)

*Primary Examiner* — Miranda Huang
(74) *Attorney, Agent, or Firm* — Dority & Manning, P.A.

(57) ABSTRACT

A system, method, and computer-readable medium for method for generating a template pruning schema from a template. A parser parses the template, where the template includes a typed data structure with one or more fields. The parser retrieves a pruning schema associated with the typed data structure. The parser also generates the template pruning schema from the pruning schema by identifying each field in the pruning schema that corresponds to the field in the template.

24 Claims, 10 Drawing Sheets

(56) References Cited

U.S. PATENT DOCUMENTS

| | | | |
|---|---|---|---|
| 2008/0077653 | A1 | 3/2008 | Morris |
| 2008/0275951 | A1 | 11/2008 | Hind et al. |
| 2009/0063499 | A1 | 3/2009 | Koinuma et al. |
| 2010/0037150 | A1 | 2/2010 | Sawant |
| 2010/0058467 | A1* | 3/2010 | Ivory et al. .......... 726/22 |
| 2010/0070566 | A1 | 3/2010 | Vandewalle |
| 2010/0306738 | A1 | 12/2010 | Verma et al. |

OTHER PUBLICATIONS

Bernstein, "Shadows in the Cave: hypertext transformations", Journal of Digital Information, vol. 10, No. 3 (2009), p. 1-10 (10 pages).

Kolbitsch et al., "Transclusions in an HTML-Based Environment", Journal of Computing and Information Technology—CIT 14, 2006, 2, 161-174 (13 pages).

Meschkat, "Simple and robust browser side template processing for Ajax based web applications", WWW, Apr. 21-25, 2008, Beijing, China, p. 1-7 (7 pages).

Meschkat, "jstemplate.js", source code file retrieved from http://google-jstemplate.googlecode.com/svn/trunk, copyright 2006 Google Inc., p. 1-13 (13 pages).

Meschkat, "util.js", source code file retrieved from http://google-jstemplate.googlecode.com/svn/trunk, copyright 2006 Google Inc., p. 1-6 (6 pages).

Meschkat, "jsevalcontext.js", source code file retrieved from http://google-jstemplate.googlecode.com/svn/trunk, copyright 2006 Google Inc., p. 1-6 (6 pages).

Meschkat, "jstemplate_test.js", source code file retrieved from http://google-jstemplate.googlecode.com/svn/trunk, copyright 2006 Google Inc., p. 1-5 (5 pages).

Nelson et al., "Back to the Future: Hypertext the Way It Used to Be", HT07, Sep. 10-12, 2007, Manchester, United Kingdom, p. 227-228 (2 pages).

Stoker, "Toucan: A Configurable Web Site Maintenance Tool", Dissertation, 2001, University of Sheffield, 44 pages.

Varda, "Protocol Buffers: Google's Data Interchange Format", retrieved from http://google-opensource.blogspot.com/ "Open Source at Google", published Jul. 7, 2008, p. 1-13 (13 pages).

http://google-jstemplate.googlecode.com/svn/trunk, 1 page, discloses a listing of source code files for jstemplate, retrieved on Dec. 5, 2011.

Hoffman, Thad, Using XML Data Islands in Mozilla, Plus Linked Files, The Mozilla Organization, Apr. 3, 2003, archived Sep. 9, 2004 http://www.mozi II a.org/xmlextras/xm ldataislands/ (19 pages).

"HSP/EzStor Tutorial" Copyright 2003 EzTools Software, archived Jun. 3, 2009 http://www.eztoolssoftware.com/tutorials/hsp/hsp howto 1 . Htm (8 pages).

McFarlane, Nigel, "Make Data Islands Work in All Browsers", archived Feb. 5, 2006, http://www.devx.com/webdev/Article/28898 (9 pages).

Goodman, Brett, "Client-side ASP scripting with HTML Scripting Pages" Copyright 2000-2001, http://www.aspfree.co m/c/a/ ASP /C I ie nts ide -ASP-scripting -with - HTM L -Scripting-Pages/ (4 pages).

Jacobs, James Q., "XML Data Binding" © http://www.jqjacobs.net/web/xml/xml data_binding.html (3 pages).

Wisman, Raymond, "Client-side XML", archived Jun. 6, 2008, http://homepages.ius.edu/rwisman/n341/htmi/XML.htm (6 pages).

Co-Pending U.S. Appl. No. 13/253,696, Meschkat et al., filed Oct. 5, 2011 (not published) (35 pages).

Office Action mailed Dec. 12, 2011, in U.S. Appl. No. 13/253,696, Meschkat et al., filed Oct. 5, 2011 (11 pages).

Co-Pending U.S. Appl. No. 13/253,663, Michael et al., filed Oct. 5, 2011(not published) (36 pages).

Office Action mailed Dec. 16, 2011, in U.S. Appl. No. 13/253,663, Michael et al., filed Oct. 5, 2011 (11 pages).

Co-Pending U.S. Appl. No. 13/253,780, Michael et al., filed Oct. 5, 2011(not published) (37 pages).

Office Action mailed Dec. 20, 2011, in U.S. Appl. No. 13/253,780, Michael et al., filed Oct. 5, 2011 (11 pages).

Co-Pending U.S. Appl. No. 13/253,814, Michael et al., filed Oct. 5, 2011 (not published) (22 pages).

Office Action mailed Feb. 21, 2012, in U.S. Appl. No. 13/253,814, Michael et al., filed Oct. 5, 2011 (8 pages).

Co-Pending U.S. Appl. No. 13/245,823, Michael et al., filed Sep. 26, 2011 (not published) (41 pages).

Office Action mailed Nov. 17, 2011, in U.S. Appl. No. 13/245,823, Michael et al., filed Sep. 26, 2011 (13 pages).

* cited by examiner

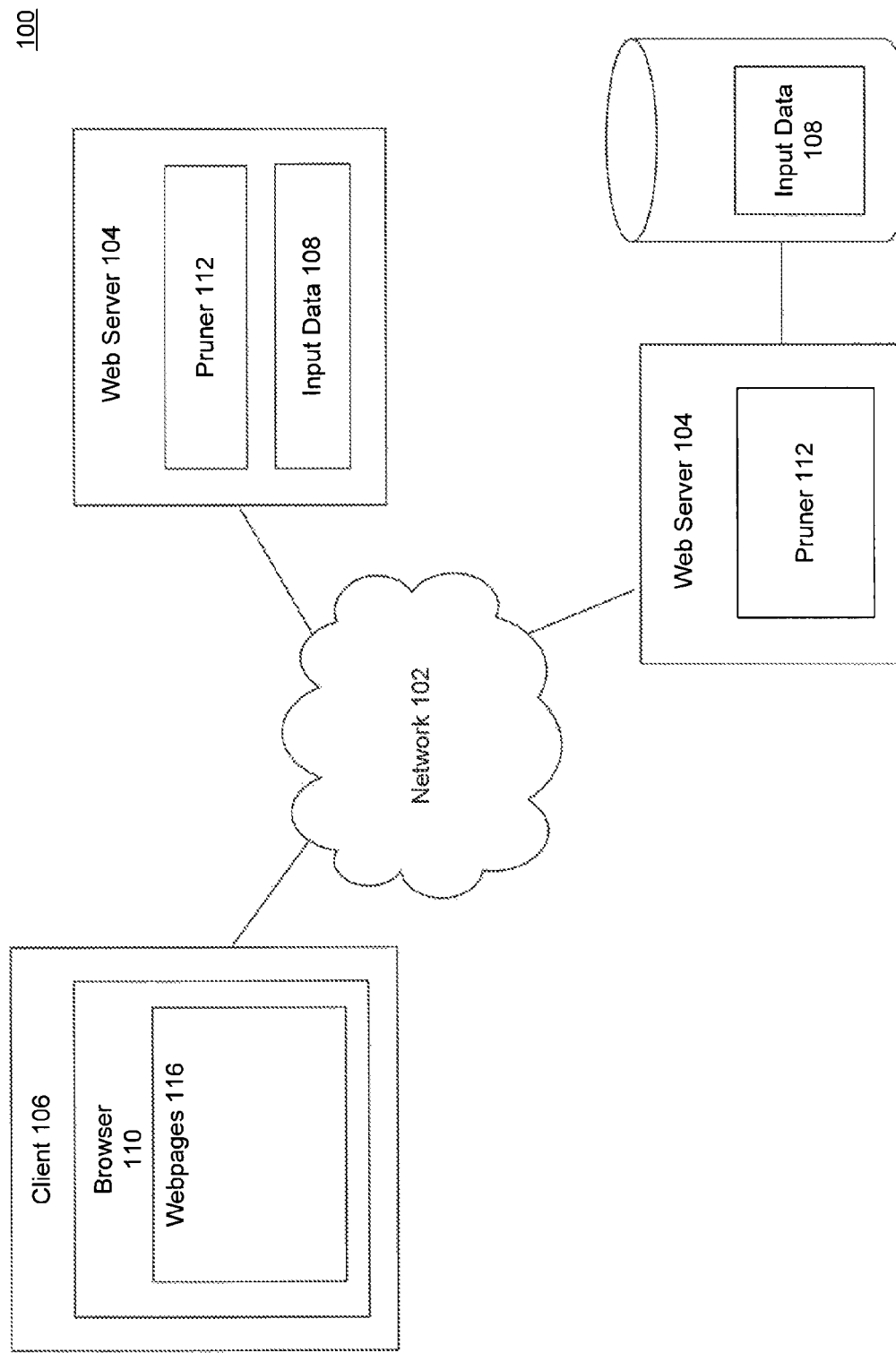

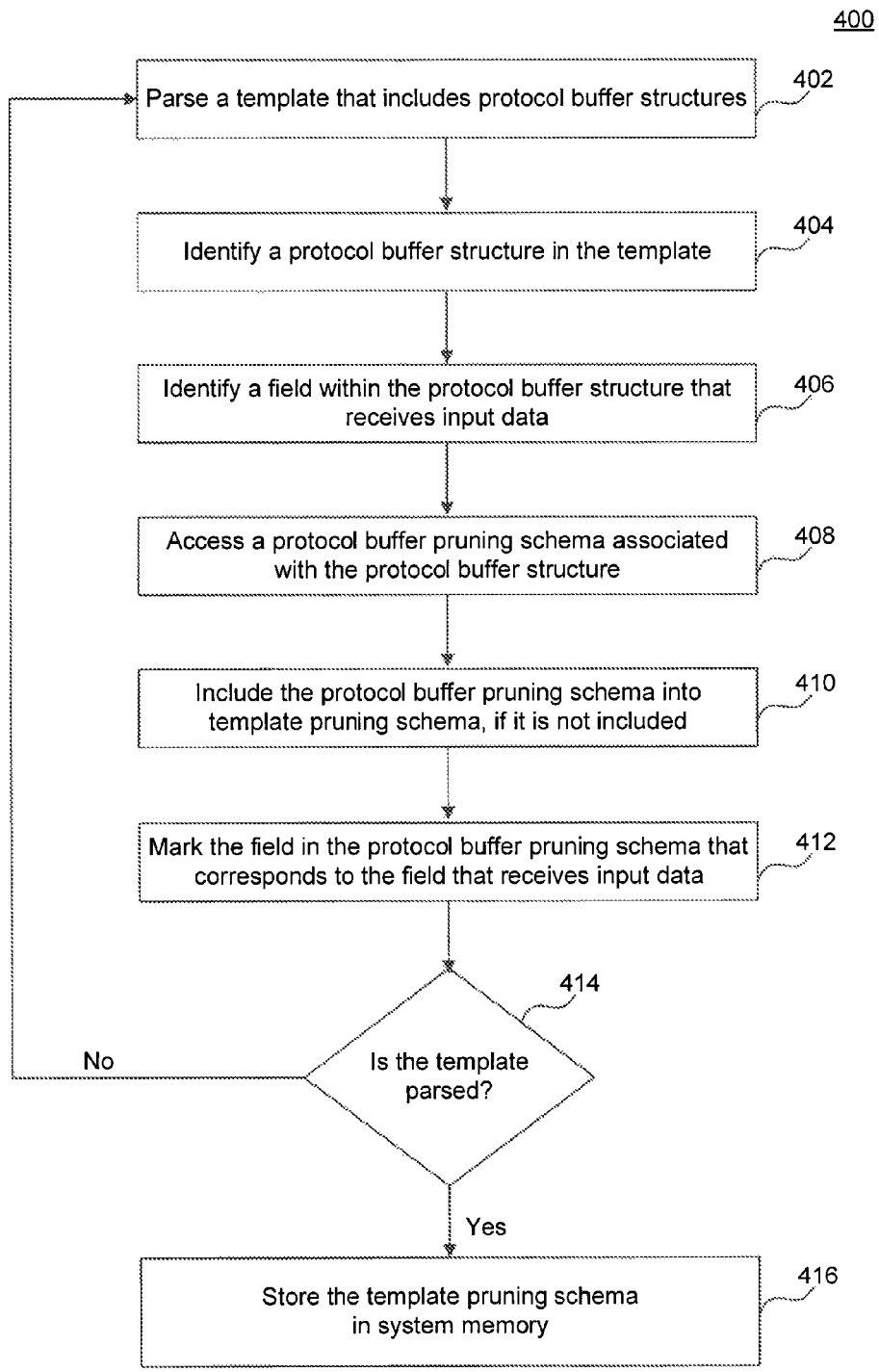

USE OF TEMPLATES AS MESSAGE PRUNING SCHEMAS

BACKGROUND

The emergence and development of computer networks and protocols, such as the Internet and the World Wide Web (or simply "web" or "Web"), allow users to download and display dynamic webpages on their computing devices. One way to display data content in a webpage is to include data into templates. Templates maintain the layout and design of a webpage and provide a webpage with an aesthetic look, while the webpage updates its content.

However, computing devices that display webpages often receive content that a webpage does not use or display. For example, when a conventional web server receives a message request from a client to update a webpage, a conventional web server may gather the requested content and sends the content to the conventional client. However, a subset of the content may already be present on the conventional client, and is needlessly sent over the network. This results in a waste of network resources and latency on a web server and a client, as they handle content that they do not need.

BRIEF SUMMARY

A system, method, and computer-readable medium for method for generating a template pruning schema from a template. A parser parses the template, where the template includes a typed data structure with one or more fields. The parser retrieves a pruning schema associated with the typed data structure. The parser also generates the template pruning schema from the pruning schema by identifying each field in the pruning schema that corresponds to the field in the typed data structure that is included in the template.

A system, method, and computer-readable medium for method for reducing the amount of data transmitted over a network. The input data is accessed with a typed data structure message, the typed data structure message associated with the typed data structure included in a template. The template pruning schema for pruning the input data is retrieved from a memory storage, where the template pruning schema is generated from a typed data structure declaration file associated with the typed data structure. The input data in the typed data structure message is pruned using the template pruning schema into a pruned input data and the pruned input data is transmitted over the network.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 1 is a block diagram of an exemplary distributed system of an environment where the embodiments of the invention may be implemented.

FIG. 4 is a flowchart of a method for generating a template pruning schema, according to an embodiment.

Figure 5A:
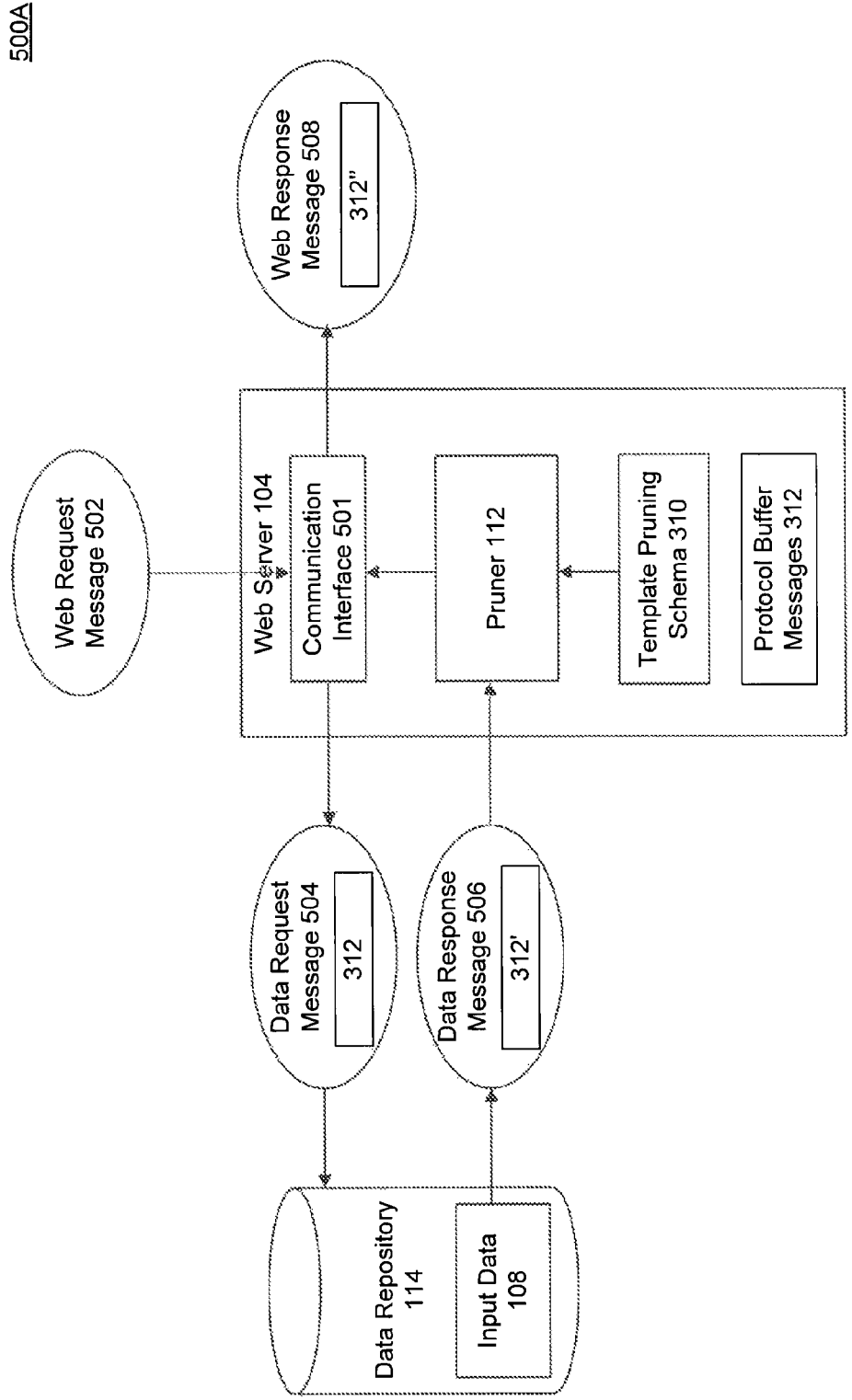
Figure 5B:
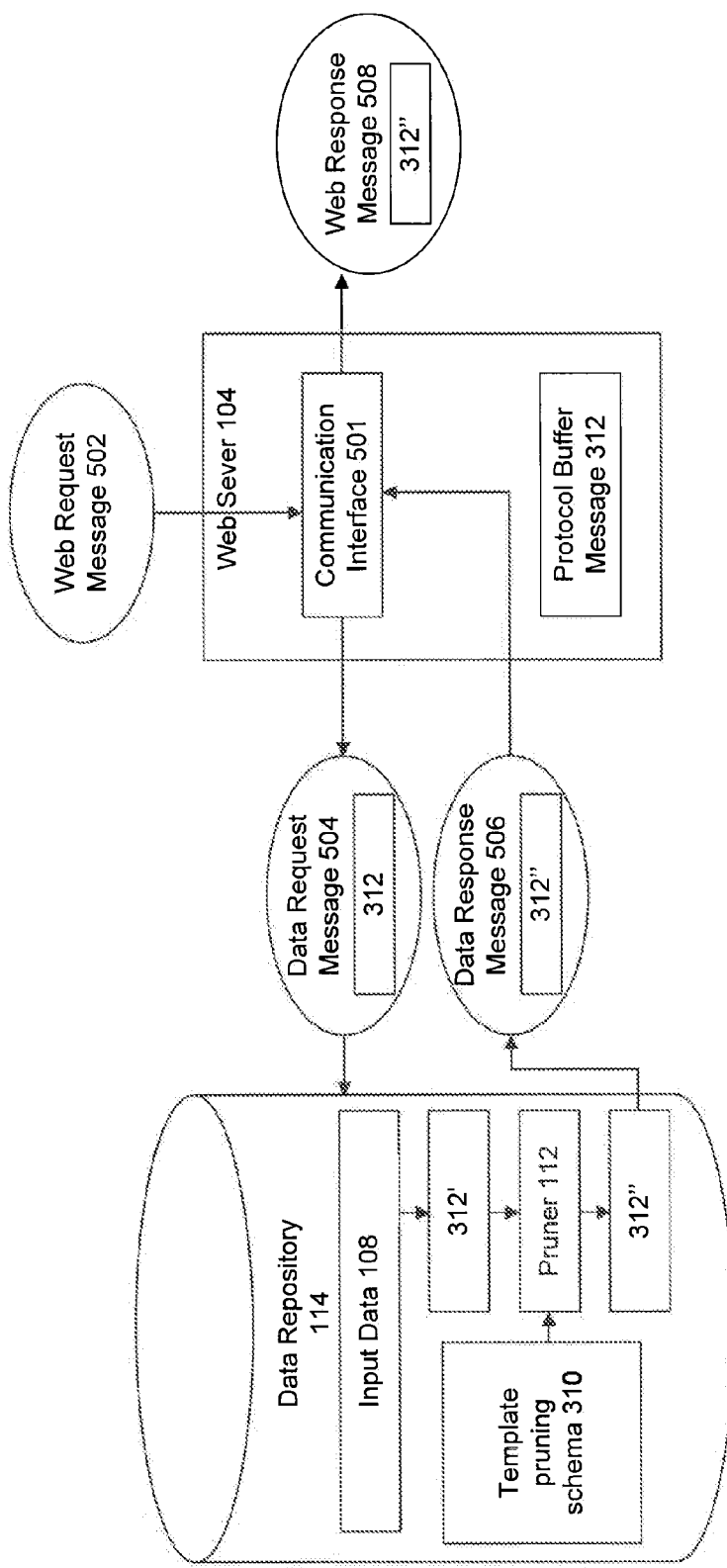
Figure 5C:
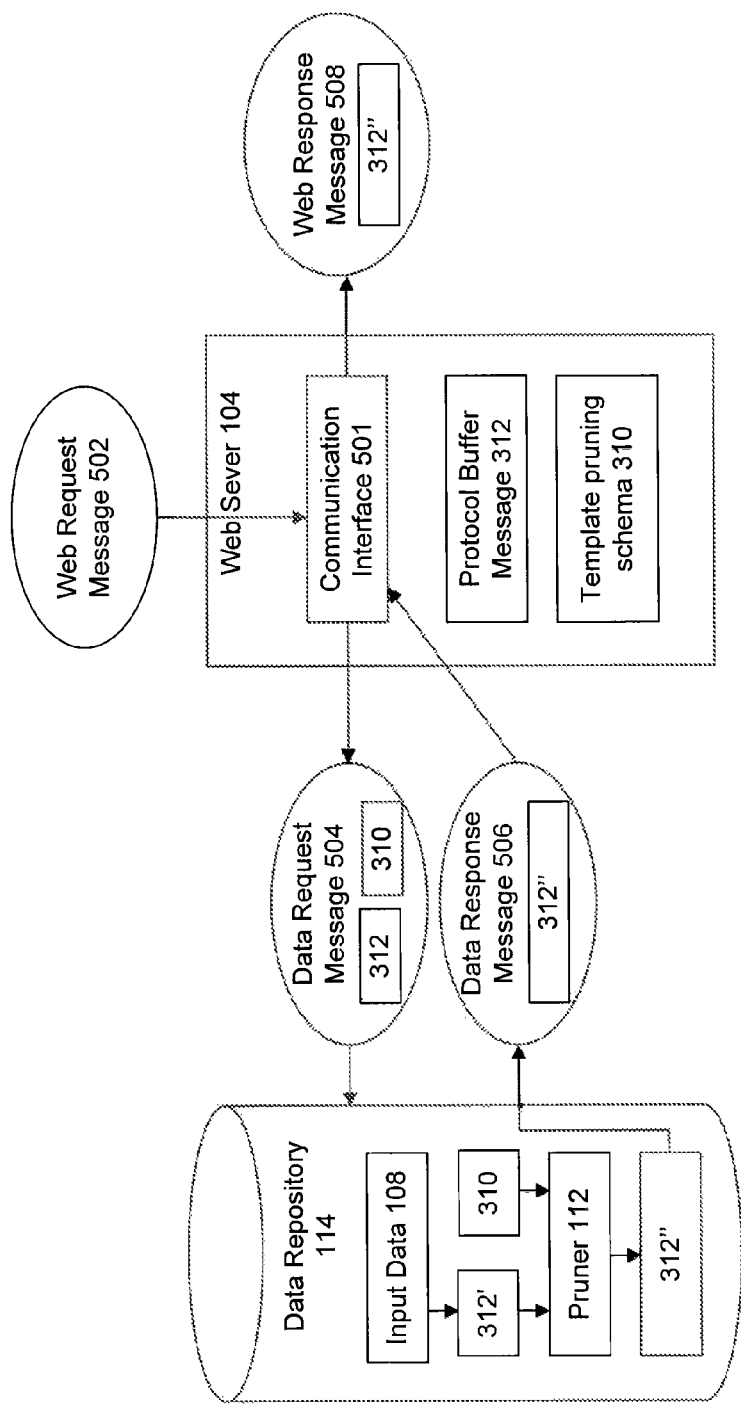

FIGS. 5A-C are exemplary embodiments of pruning environments 500A-C.

Figure 6:
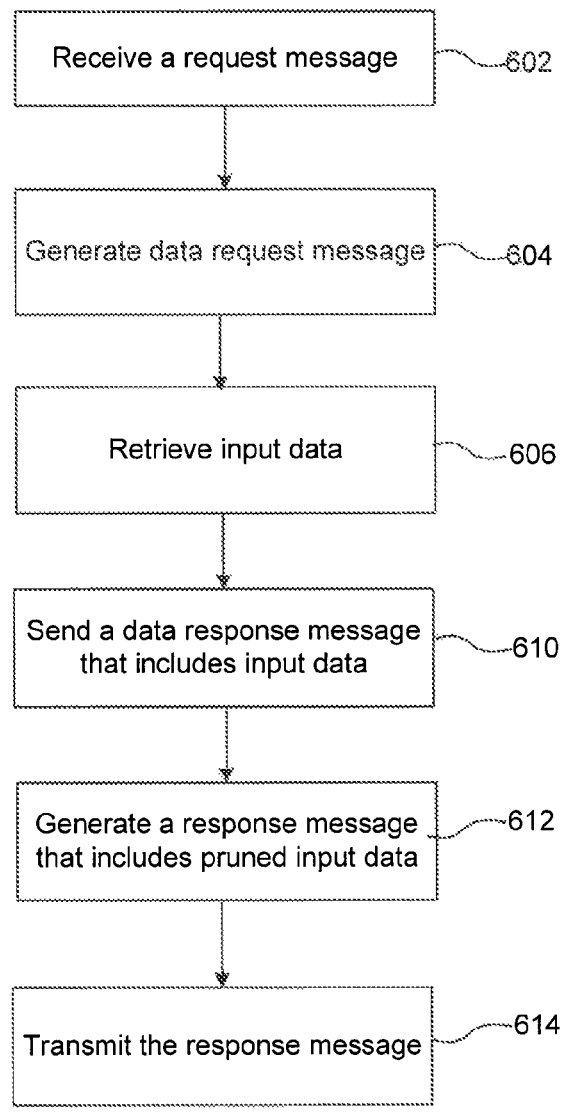

FIG. 6 is a flowchart for pruning input data, according to an embodiment.

Figure 7:
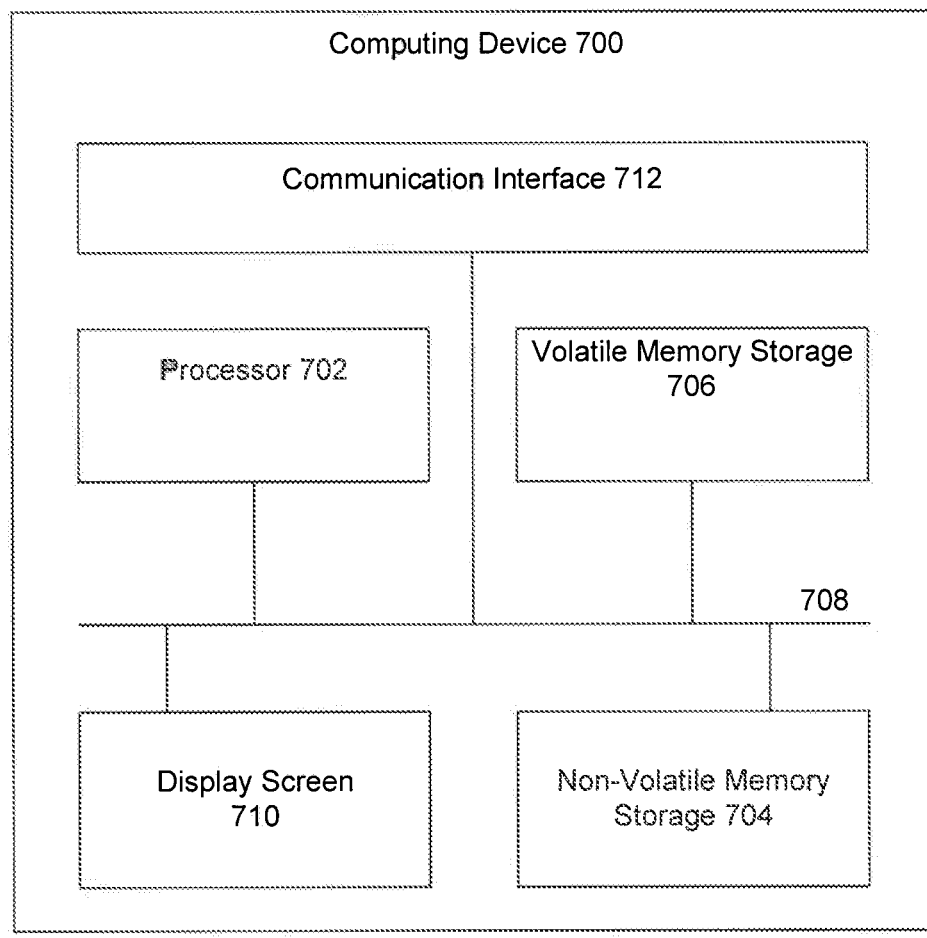

FIG. 7 is a block diagram of an exemplary computing environment where the embodiments of the invention may be implemented.

DETAILED DESCRIPTION OF EMBODIMENTS

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

I. Introduction

FIG. 1 is a block diagram of an exemplary distributed system 100 where the embodiments of the invention may be implemented. Distributed system 100 includes a network 102, a web server 104 and a client 106. Network 102 connects client 106 and web server 104. Distributed system 100 may include thousands of web servers 104 and clients 106.

Network 102 may be any network or combination of networks that can carry data communication. Such a network 102 may include, but is not limited to, a local area network, metropolitan area network, and/or wide area network such as the Internet and the Web. Network 102 can support protocols and technologies including, but not limited to, Web protocols and/or services. Intermediate web servers, gateways, or other servers may be provided between components of the system shown in FIG. 1 depending upon a particular application or environment.

Web server 104 is an electronic device or an application executing on an electronic device capable of sending, receiving, accessing and storing resources. Resources include data inserted into hypertext markup language (HTML) pages, word processing documents, portable document format (PDF) documents, images, video, and feed sources, to name only a few. Resources can be provided to client 106 over network 102.

Web server 104 stores or accesses input data 108. Input data 108 is data that client 106 requests from web server 104. In one embodiment, web server 104 may store input data 108 in its primary or secondary memory (described in detail in FIG. 7.) In another embodiment web server 104 retrieves input data 108 from a data repository 114. Data repository 114 is a database or a storage repository located on a computing device such as a backend server. Data repository 114 stores input data 108 and may provide communication and pruning functionality to other computing devices through the backend server.

When web server 104 receives a request message, such as a hypertext transfer protocol (HTTP) request for input data 108, web server 104 may retrieve input data 108 from its primary or secondary memory in one embodiment. In another embodiment, web server 104 uses network 102 to retrieve input data 108 from data repository 114. Web server 104 then sends input data 108 for display on client 106.

In an embodiment, web server 104 includes a pruner 112. Pruner 112 reduces the amount of input data 108 that web server 104 transmits to client 106. For example, pruner 112 filters input data 108 that will be discarded by client 106 prior to input data 108 leaving server 104. In an embodiment, pruner 112 filters input data 108 when client 106 requests data updates from web server 104.

Client 106 is an electronic computing device capable of requesting and receiving resources over network 102. Example clients 106 are personal computers, mobile communication devices, (e.g. smart phones, tablet computing devices, notebooks), set-top boxes, game-console embedded systems, and other devices that can send and receive input data 108 over network 102.

According to a feature here, display input data 108, client 106 may execute an application, such as a web browser (or simply "browser") 110. In an embodiment, browser 110 displays input data 108 in webpages 116. Webpage 116 is a document that includes input data 108 that is sent from web server 104 to client 106. Although webpage 116 may be in any format, typically, webpage 116 is presented using HyperText Markup Language ("HTML") or eXtensible HyperText Markup Language ("XHTML")

Webpage 116 is typically created by a web page developer. For example, a web page developer may use a text editor to design a webpage in, for example, an HTML or XHTML format. In an embodiment, a web page developer includes templates in webpage 116. Templates separate content inside webpage 116 so that the content is presented in formatted sections of webpage 116. For example, templates may separate input data 108 on webpage 116 into multiple, independent, and reusable sections or forms.

In an embodiment, a developer may create templates that use typed data structures as input parameters that receive input data 108. A typed data structure is a data structure that includes type-defined primitive fields. Example fields are an integer, a float, a string, etc., or another typed data structure. Web server 104 uses the typed data structure to retrieve data from data repository 114 or its own memory storage and passes the typed data structure to client 106 as part of the HTTP response message. When data repository 114 receives the typed data structure, data repository includes input data 108 in fields that are included in the typed data structure. However, because a template may not use all fields included in the typed data structure, a subset of input data 108 included in the typed data structure is needlessly transmitted through network 102.

To prevent the unused input data 108 from being transmitted over network, a developer uses templates to generate a template pruning schemas that act as filters for each typed data structure included in the template.

II. Building a Message Pruning Schema

Figure 2A:
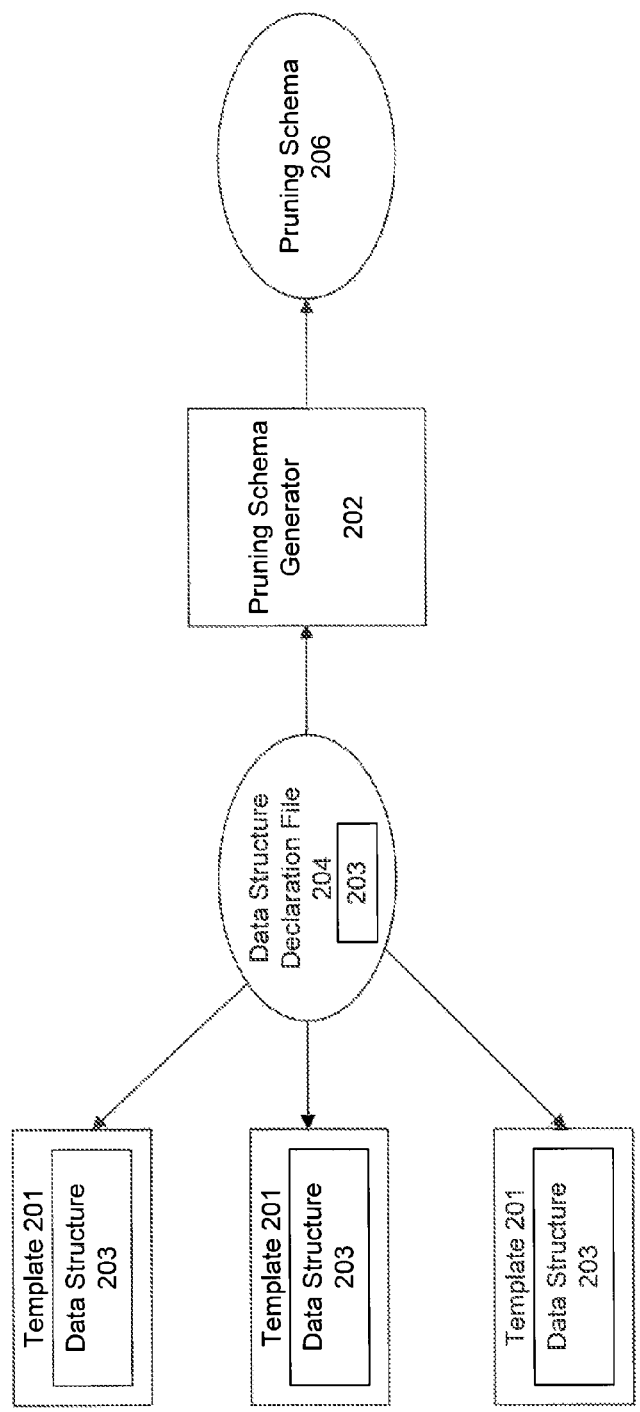
FIG. 2A is a block diagram of an exemplary embodiment for generating a pruning schema.

FIG. 2A is a block diagram of an exemplary embodiment 200 for generating a pruning schema for a typed data structure. Exemplary embodiment 200 includes a pruning schema generator 202. Pruning schema generator 202 receives a data structure declaration file 204 as input and generates a pruning schema 206 for each data structure 203 included in data structure declaration file 204. Typed data structures 203 declared in data structure declaration files 204 are also included in a template 201. Those data structures 203 include fields that are input parameters that receive input data 108 that browser 110 displays to a user.

Pruning schema generator 202 generates pruning schema 206 from data structure declaration file 204. Pruning schema generator 202 generates pruning schema 206 by defining another data structure that is similar to data structure 203 defined in declaration file 204. Pruning schema 206 includes fields in data structure 203 that receive input data 108 in template 201 and instructions for removing input data 108 from fields that are not used by template 201. An exemplary embodiment for generating pruning schema 206 is described in detail in U.S. patent application Ser. No. 12/882,873, which is incorporated by reference in its entirety. Typically, pruning schema 206 is an unmarked pruning schema that may be configured to prune input data 108 for different templates 201 that include data structure 203.

Figure 2B:
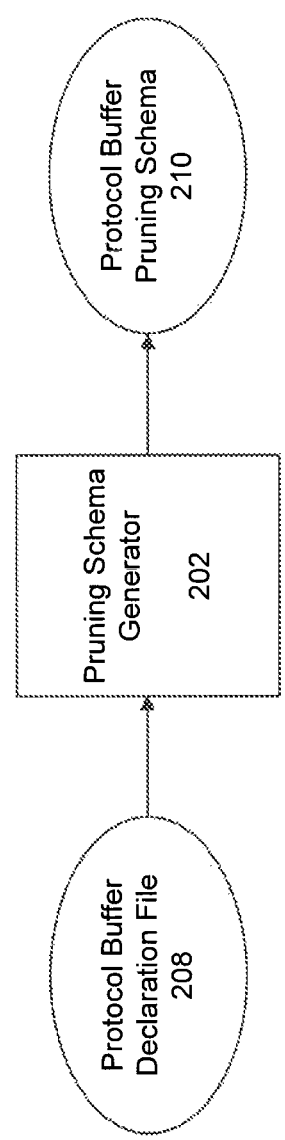
FIG. 2B is a block diagram of an exemplary embodiment for generating a protocol buffer pruning schema.

In an embodiment, an example of a typed data structure is a protocol buffer message. FIG. 2B is an exemplary embodiment of a pruning schema generator 202 for generating a protocol buffer schema 210 from a protocol buffer declaration file 208.

A protocol buffer structure is a typed data structure defined in protocol buffer declaration file (".proto" file) 208. Each protocol buffer structure in ".proto" file 208 defines a record of information in a series of name-value pair fields with a specific type-defined primitive for each name. In an embodiment, the type may include another protocol buffer message. Below is an example .proto file 208 "Result-.proto":

```
syntax = "proto2";
package maps_jslayout;
message Result {
    repeated LineSnippet line_snippet_array = 1;
}
message LineSnippet {
    optional string text = 1;
    optional int32 id = 2;
    optional string type = 3;
}
```

"Result.proto" declaration file includes two protocol buffer structures, "Result" and "LineSnippet". "Result" structure includes the "LineSnippet" structure as a field. The "LineSnippet" structure includes primitive types defined as "text", "id", and "type" as fields.

In an embodiment, pruning schema generator 202 may generate a protocol buffer pruning schema 210 for the protocol buffer structure declared in ".proto" file 208. Protocol buffer pruning schema 210 may then be configured to include the fields of protocol buffer structures that are included in template 201. However, each filed in protocol buffer schema has, for example, a Boolean data type and may include values "true" (that may be set to "1") and false (that may be set to"0".) Below, is an example pruning schema for "Result.proto",

```
syntax = "proto2";
package maps_jslayout.prune;
message Result {
    repeated LineSnippet line_snippet array = 1;
}
```

-continued

```
message LineSnippet {
    optional bool text = 1;
    optional bool id = 2;
    optional bool type = 3;
}
```

III. Using a Pruning Schema in a Template Processing System

Pruning Schemas 206 prune input data 108 for templates 201 that are used by a template processing system to create HTML documents that client 106 uses to render webpages 116. Such example template processing system is disclosed in the U.S. Patent Application 61/449,583 ("'583 application") that is incorporated by reference in its entirety. However, a person skilled in the art will appreciate that the embodiments of the invention are not limited to the template processing system described herein, and may be applied to other template processing systems.

Template processing system disclosed in the '583 application decouples the template building and compilation process from the webpage rendering process. During the building and compilation process, template building module generates template objects from templates 201 included in template files, such as HTML template files. The template building and compilation process also generates a template pruning schemas for each template 201 that includes pruning schemas 206 with marked fields. The generated template objects, template pruning schemas, and other template processing system components described herein, are then uploaded onto web server 104 to process and update requests from browser 110.

During the rendering process, web server 104 combines the template objects with input data 108 and generates an HTML document. Web server 104 sends the HTML document for display to client 106. When client 106 requests an update of input data 108, web server 104 uses one or more template pruning schemas 206 to filter input data 108 into a subset of input data 108 that is required to update the data on client 106. Web server 104 then sends a response message that includes input data 108 for display on client 106. Unlike conventional systems that send a complete snapshot of the input data to a client, pruner 112 allows web server 104 to send only a subset of input data 108 that includes updated data. This allows web server 104 to avoid sending unnecessary input data 108 over network 102.

Figure 3:
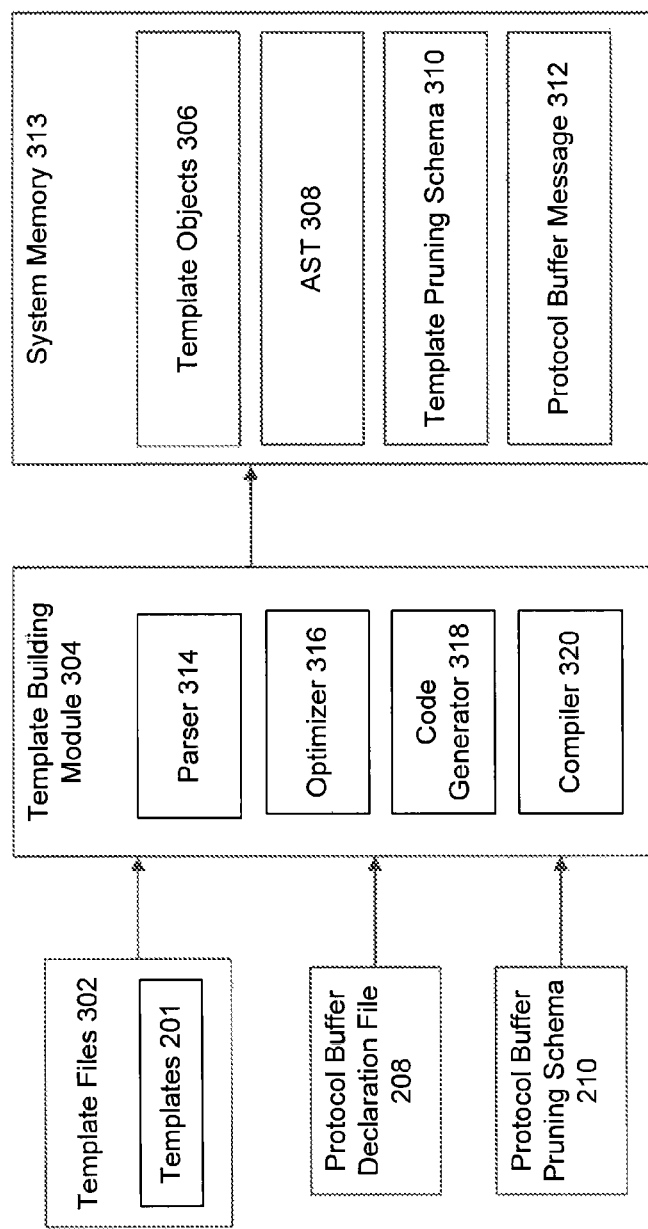
FIG. 3 is a block diagram of an exemplary embodiment for building and compiling a template using a template building module.

A. Configuring a Pruning Schema during the Template Building and Compilation Process FIG. 3 is a block diagram of an exemplary embodiment 300 generating a template pruning schema. Environment 300 includes a template building module 304. Template building module builds and compiles template objects 306 that render the HTML document.

During the building and compilation process, template building module 304 uses templates 201 in template files 302 to generate template objects 306, abstract syntax trees (ASTs) 308, template pruning schemas 310 and protocol buffer messages 312. After the building process is complete, template objects 306, ASTs 308 and template pruning schemas 310 and protocol buffer messages 312 are uploaded to web server 104 for rendering and updating webpage 116 and updating webpage 116.

In an embodiment, template object 306 is created from template 201. Template 201 typically includes formatted code, such as HTML markup code, processing instructions, expressions and attributes that are interpreted by template building module 304. Template 201 may be statically modified by being loaded into a text editor or browser 110 prior to the building and compilation process. In an embodiment, template 201 includes typed data structures that are protocol buffer messages. Below is example file "foo.html" that includes template "result_template". "result_template" includes protocol buffer structures "Result", defined as "result_message" and "LineSnippet", defined as "snippet", that are declared in "Result.proto", described above.

```
<html
jsimport="template/prototemplate/jslayout/examples/snippet/result.proto">
<div jstemplate="result_template; result_message:maps_jslayout.
Result">
Snippets:
    <div jsselect="snippet: result_message.line_snippet_array">
        <span jscontent="snippet.id + 'is of type' + snippet.type">
            Text here is replaced with "snippet X is of type Y"
        </span>
    </div>
</div>
</html>
```

As part of the template building and compilation process, pruning schema generator 202 uses ".proto" file 208 to generate protocol buffer schema 210. Protocol buffer schema 210 includes unmarked fields that correspond to the fields in protocol buffer message 312 that may be configured for different templates 201. Exemplary protocol buffer schema 210 for protocol buffer structures "Result" and "LineSnippet" are described above.

Template building module 304 includes a parser 314, an optimizer 316, a code generator 318 and a compiler 320. Parser 314 parses, for example, the HTML syntax in each template 201 included in template file 302, verifies that data-types of the input parameters that receive input data 108 are consistent with their declarations, that ".proto" files 208 are accessible and that fields specified in template 201 for protocol buffer data structures exist in ".proto" file 208.

Parser 314 also generates AST 308 from template 201. AST 308 may be a tree representation of template 201, and is described in detail in the '583 patent application. In an embodiment, AST 308 may represent protocol buffer message 312.

Parser 314 also generates a template pruning schema 310. In an embodiment, template pruning schema 310 is a text file. Template pruning schema 310 includes protocol buffer schema 210 for each protocol buffer structure included in template 201. Additionally, parser 314 determines the fields of each protocol buffer structure in template 201 that serve as input parameters. Parser 314 marks each of those fields in the corresponding protocol buffer schema 210 included in template pruning schema 310. When parser 314 completes parsing template 201, parser 314 generates template pruning schema 310 that includes a marked field, for each field in protocol buffer structure that receives input data 108 in template 201. A person skilled in the art will appreciate that template pruning schema 310 may include multiple protocol buffer schemas 210, if multiple protocol buffer structures are declared in template 201.

For example, template "results_message", described above, includes a protocol buffer structure "LineSnippet" (which is declared as "snippet"). The fields "id" and "type", declared as "snippet.id" and "snippet.type" serve as input parameters in template foo.html. When parser 224 generates template pruning schema 310, such as "foo.html:result_template" for "foo.html", parser includes protocol buffer schema 312 for "LineSnippet" in "foo.html:result_template". Parser 224 also marks fields "id" and "type" in protocol buffer schema for LineSnippet as "true". This corresponds to fields "id" and "type" being used as input parameters in template "results_messag". Example, "foo.html:result_timeplate" is described below:

```
line_snippet_array <
    text: false  // though, this is implied if this line is missing.
    id: true    // because snippet.id was accessed
    type: true  // because snippet.type was accessed
>
```

After parser 314 parses template 201, parser 314 passes a parsed template to optimizer 316.

In an embodiment, optimizer 316 optimizes expressions and processing instructions in templates 201. For example, optimizer 316 may optimize the generated code to consume less system memory (system memory is described in detail in FIG. 7) during the rendering stage. In another example, optimizer 316 may decrease the control processing unit (CPU) time for executing template objects 306.

Code generator 318 converts template 201 into a template class. In an embodiment, template class has the same name as template 201. A person skilled in the art will appreciate that code generator 318 may generate template class in C++, Java, Python or any other object-oriented programming language known to a person skilled in the art. In addition to template classes, a template application developer may write front end rendering code. Front end rendering code references a declaration for each template class, a code to initialize and compose protocol buffer message 312 that includes input data 108 and is discussed in detail in the '583 patent application.

Compiler 320 converts (compiles) template classes and front end rendering code into template objects 306 and front end rendering objects. In an embodiment, compiler 320 may be a C++ compiler. However, a person skilled in the art will appreciate that a compiler for other languages, such as Java may be used. Template objects 306 and front end rendering objects are binary objects that include computer-executable code that reads and manipulates input data 108 on web server 104.

Compiler 320 also compiles protocol buffer message 312 for each protocol buffer structure declared in ".proto" files 208. Protocol buffer message 312 is a binary object that, for example, includes "set( )" and "get( )" methods for storing and retrieving input data 108.

After the compilation is complete, template objects 306, ASTs 308, front end rendering objects, protocol buffer messages 312 and template pruning schemas 310 are stored in system memory 313 (Different types of system memory 313 are described in detail in FIG. 7), until web developer uploads them to web server 104.

FIG. 4 is a flowchart 400 of a method for generating a template pruning schema, according to an embodiment. Prior to stage 402, pruning schema 206 has been generated for each typed data structure included in data structure declaration file 204. For example, pruning schema generator 202 generated protocol buffer schema 210 from ".proto" file 208. Also, prior to stage 402, template building module 304 allocated memory in memory storage 313 for template pruning schema 310.

At stage 402, a template is parsed. For example, parser 314 parses template 201 that include a typed data structures. The typed data structure is declared in ".proto" file 208, as described herein.

At stage 404, a typed data structure is identified. For example, as parser 314 parses template 201 it encounters a protocol buffer structure that receives input data 108. Parser 314 identifies the typed data structure by accessing an associated data structure declaration file 204, such as in ".proto" file 208.

At stage 406, a field within a typed data structured is identified. For example, parser 314 identifies a field in the protocol buffer structure in template 201 that receives input data 108.

At stage 408, a protocol buffer schema is accessed. For example, parser 314 accesses protocol buffer schema 210 from the memory of a computing device where a web developer designs templates 201.

At stage 410, the protocol buffer schema of step 408 is included in template pruning schema 310.

At stage 412, a field is marked. For example, parser 314 marks the field in protocol buffer schema 210 that corresponds to the field, associated with the protocol buffer structure in template 201.

At stage 414, a determination is made as to whether the parsing of a template is complete. For example, parser 314 determines whether the parsing of template 201 is complete. If the parsing is complete, the flowchart proceeds to step 416. Otherwise the flowchart proceeds to step 402 and parser 314 continues to parse template 201.

At stage 416, a template pruning schema is stored on a computing device. For example, template building module 304 stores template pruning schema 310 in system memory 313. Template pruning schema 310 includes protocol buffer schemas 210 for protocol buffer structures that are included in template 201. Also, each protocol buffer schemas 210 included in template pruning schema 310 includes marked fields that correspond to the fields in the protocol buffer structure that receive input data 108 in template 201.

B. Pruning Input Data with a Template Pruning Schema

After template building module 304 generates template objects 306, ASTs 308, protocol buffer messages 312 and template pruning schemas 310, that are uploaded to web server 104 either by a web page developer or an automated computer processes, such as, a Cron job scheduler. Exemplary, template processing system installed on web server 104 renders HTML documents using the components described above and is described in detail in the patent application '583.

Template processing system uses pruner 112 to prune input data 108 that web server 104 sends to clients 106. In an embodiment, template processing system uses pruner 112 to prune input data 108 updates to client 106. For example, when client 106 sends a request to web server 104 for webpage 116, web server 104 generates an HTML document that is sends for display to client 106. However, client 106 may also send message request to update input data 108 included on webpage 116. When web server 104 receives a request to update input data 108, web server 104 uses pruner 112 to prune input data 108. Unlike conventional systems, where web server sends input data for the entire website, the pruning allows web server 104 to send input data 108 for data content on client 106 that requires updating.

FIG. 5A is an exemplary embodiment of a pruning environment 500A. Pruning environment 500A includes web server 104 and data repository 114. A person skilled in the art will appreciate that data repository 114 may be local or remote from web server 104 and may be included on the same computing device as web server 104 or communicate with web server 104 over network 102.

Web server 104 includes communication interface 501. Communication interface 501 receives and transmits messages to and from web server 104. Example messages include a web request message 502, a data request message 504, a data response message 506 and a web response message 508.

In an embodiment, web request message 502 is a request message for an update of input data 108 displayed on webpage 116. Web server 104 receives web request message 502 from browser 110. In an embodiment, web message request 502 may include protocol buffer message 312 that web server 104 loads with input data 108. In another embodiment, web request message 502 includes references to protocol buffer messages 312. Web server 104 uses those references to retrieve protocol buffer messages 312 stored on web server 104.

Data request message 504 is a request message for data. For example, when web server 104 receives web request message 502, it uses data request message 504 to request input data 108 from data repository 114. Web server 104 includes protocol buffer message 312 into data request message 504.

When data repository 114 receives data request 504, data repository 114 retrieves input data 108. Data repository 114 loads input data 108 in protocol buffer message 312. For example, data repository 114 generates protocol buffer message 312' by loading input data 108 into the fields associated with protocol buffer message 312. After data repository 114 generates protocol buffer message 312', it includes protocol buffer message 312' into data response message 506. Data repository 114 then transmits data response message 506 to web server 104.

When web server 104 receives data response message 506, pruner 112 prunes protocol buffer message 312' included in data response message 506. Pruner 112 uses template pruning schema 310 to prune input data 108 included in protocol buffer messages 312'. For example, pruner 112 retains input data 108 in protocol buffer message 312' in fields that are marked in template pruning schema 310.

In one embodiment, pruner 112 obtains template pruning schema 310 from web server 104. For example, web request message 502 may include a reference to template pruning schema 310 that pruner 112 may use to prune input data 108. In another embodiment, template pruning data 310 may be provided in web request message 502.

Pruner 112 creates a protocol buffer message 312". Protocol buffer message 312" includes pruned input data 108. Pruner 112 discards input data 108 that corresponds to the unmarked fields in template pruning schema 310. In this way, pruner 112 prevents unused input data 108 from being transmitted over network 102.

After pruner 112 generates protocol buffer message 312", web server 104 creates web response message 508. Web response message 508 includes protocol buffer message 312" that web server 104 sends to client 106 using communication interface 501.

For example, when client 106 wants to update webpage 116 that includes template "foo.html", client 106 sends web request message 502 to web server 104. In an embodiment, web request message 502 includes a reference to template pruning schema "foo.html:result_template" and protocol buffer message "Result".

Web server 104, uses protocol buffer message "Result" to obtain input data 108 from data repository 114. For example, web server 104 sends data request message 504 that includes protocol buffer message "Result" to data repository 114. In response, data repository 14 sends data response message 506 that includes input data 108 in protocol buffer message "Result". Example below, described input data 108 included in protocol buffer message "Result".

```
line_snippet_array <
    text: "Probably the best deal for sushi in NYC
Despite the price it's an amazing deal."
    id: 0
    type: "review"
>
line_snippet_array <
    text: "Not worth your money this restaurant came
highly recommended from my friend. but it turned out to be
a bit of a disappointment."
    id: 1
    type: "review"
>
line_snippet_array <
    text: "When someone sits down at his sushi bar, is
moved by his fish and announces, 'I've never tasted
anything like it'."
    id: 2
    type: "website"
>
```

Input data 108 stored in protocol buffer message "Result" includes three instances of protocol buffer message LineSnippet. Each protocol buffer message LineSnippet includes three fields, "text", "id", and "type, as declared in the "Result.proto" declaration file, described above.

Web server 104 passes protocol buffer message "Result" to pruner 112. Pruner 112 applies template pruning schema "foo.html:result_template" to protocol buffer message "Result". As described herein, in template pruning schema "foo.html:result_template" the marked fields are field "type" and field "id". After pruner 112 applies template pruning schema "foo.html:result_template" to input data 108 in protocol buffer message "Result", the pruned protocol buffer message "Result" includes input data 108 that includes:

```
line_snippet_array <
    id: 0
    type: "review"
>
line_snippet_array <
    id: 1
    type: "review"
>
line_snippet_array <
    id: 2
    type: "website"
>
```

Web server 104 sends the pruned protocol buffer message "Result" to client 106.

FIG. 5B-C are exemplary embodiments of pruning environments 500B and 500C. In pruning environments 500B and 500C, data repository 114 includes pruner 112. In pruning environment 500B, data repository 114 may store template pruning schema 310. In pruning environment 500C, data repository 114 may receive template pruning schema 310 from web server 104 in data request message 504.

When data repository 114 receives data request message 504 from web server 104, data repository 114 generates protocol buffer message 312'. Protocol buffer message 312' includes input data 108 loaded into protocol buffer message 312.

Prior to sending input data 108 to web server 104, data repository 114 prunes protocol buffer message 312 with pruner 112. Pruner 112 uses template pruning schema 310 to prune input data 108 included in protocol buffer message 312'. The pruned input data 108 is stored in protocol buffer message 312". After pruning, data repository 114 generates data response message 506 that includes protocol buffer message 312", and transmits data response message 506 to web server 104.

When web server 104 receives data response message 506, web server 104 generates web response message 508. Web response message 508 includes pruned protocol buffer message 312". Communication interface 501 transmits web response message 508 to client 106.

FIG. 6 is a flowchart 600 for pruning input data, according to an embodiment.

At stage 602, a web request message is received. For example, web server 104 receives web request message 502 from client 106. In an embodiment, web request message 502 requests input data 108 from web server 104 to update webpage 116.

At stage 604, a data request message is generated. For example, web server 104 generates a data request message 504 to data repository 114. Data request message 504 includes protocol buffer messages 312. As described herein, protocol buffer message 312 may be included in web request message 502, in one embodiment. In another embodiment, web request message 502 may include a reference to protocol buffer message 312 so that it can be retrieved from web server 104.

At stage 606, input data is retrieved. For example, data repository 114 receives data request message 504. Data repository 114 retrieves protocol buffer message 312 from data request message 504 and generates protocol buffer message 312' to be transmitted to web server 104. The generated protocol buffer message 312' includes input data 108.

At stage 608, a data response message is transmitted. For example, data repository 114 includes protocol buffer message 312' in data response message 506, and transmits data response message 506 to web server 104.

At stage 610, input data is pruned. For example, pruner 112 uses template pruning schema 310 to prune input data 108 in protocol buffer message 312', as described herein. Pruner 112 generates protocol buffer message 312" that includes pruned input data 108.

At stage 612, a web response message is generated. For example, web server 104 generates web response message 508 that includes protocol buffer message 312".

At stage 614, a web response message is transmitted. For example, communication interface 501 transmits web response message 508 to client 106.

FIG. 7 is a block diagram of an example computer system 700 in which embodiments of the present invention, or portions thereof, may be implemented as computer-readable code. For example, the components or modules of system 100 may be implemented in one or more computer systems 700 using hardware, software, firmware, tangible computer-readable media having instructions stored thereon, or a combination thereof and may be implemented in one or more computer systems or other processing systems. Hardware, software, or any combination of such may embody any of the modules and components in FIGS. 1-6.

Web server 104 and client 106 can include one or more computing devices. Web server 104 and client 106 can include one or more processors 702, one or more non-volatile storage mediums 704, one or more memory devices 706, a communication infrastructure 708, a display screen 710 and a communication interface 712. Processors 702 can include any conventional or special-purpose processor, including, but not limited to, digital signal processor (DSP), field programmable gate array (FPGA), and application-specific integrated circuit (ASIC). Non-volatile storage 704 can include one or more of a hard disk drive, flash memory, and like devices that can store computer program instructions and data on computer readable media. One or more of non-volatile storage device 704 can be a removable storage device. Memory devices 706 can include one or more volatile memory devices such as, but not limited to, random access memory. Communication infrastructure 708 can include one or more device interconnection buses such as Ethernet, Peripheral Component Interconnect (PCI), and the like.

Typically, computer instructions executing on web server 104 or client 106 are executed using one or more processors 702 and can be stored in non-volatile storage medium 704 or memory devices 706.

Display screen 710 allows results of the computer operations to be displayed to a user or an application developer.

Communication interface 712 allows software and data to be transferred between computer system 700 and external devices. Communication interface 712 may include a modem, a network interface (such as an Ethernet card), a communications port, a PCMCIA slot and card, or the like. Software and data transferred via communication interface 712 may be in the form of signals, which may be electronic, electromagnetic, optical, or other signals capable of being received by communication interface 712. These signals may be provided to communication interface 712 via a communications path. Communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof, The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary section may set forth one or more but not all exemplary embodiments as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for generating a template pruning schema, comprising:
   parsing a template for generating an HTML document that displays a formatted webpage, the template including one or more typed data structures, each typed data structure in the one or more typed data structures including one or more typed data fields;
   for each typed data structure, retrieving a pruning schema specific to the typed data structure, wherein the pruning schema includes a data type for each typed data field in the typed data structure; and
   generating the template pruning schema from the retrieved one or more pruning schemas, wherein the template pruning schema identifies the one or more fields in each of the typed data structures that are included in the template.

2. The computer-implemented method of claim 1, wherein the generating further comprises:
   marking one or more fields in the template pruning schema that correspond to the one or more fields in each of the typed data structures included in the template, wherein each marked field in the template pruning schema indicates that a corresponding field in the typed data structure receives input data included in the HTML document.

3. The computer-implemented method of claim 1, wherein the template pruning schema prunes input data prior to transferring a pruned input data over a network.

4. The computer-implemented method of claim 1, wherein the typed data structure is a protocol buffer message.

5. The computer-implemented method of claim 4, further comprising:
   generating the pruning schema specific to each typed data structure using a typed data structure declaration file associated with each typed data structure.

6. The computer-implemented method of claim 5, wherein the typed data structure declaration file is a protocol buffer declaration file.

7. A system for generating a template pruning schema comprising:
   a memory storage configured to store a template for generating an HTML document that displays a formatted webpage and one or more pruning schemas, wherein the template includes one or more typed data structures, and each typed data structure in one or more typed data structures includes one or more typed data fields; and
   a template building module configured to:
      parse the template, wherein the parsing identifies the one or more typed data fields in each typed data structure that is included in the template;
      for each typed data structure, retrieve a pruning schema specific to the typed data structure; wherein the pruning schema includes a data type for each typed data field in the typed data structure; and
      generate the template pruning schema from the retrieved one or more pruning schemas, wherein the template pruning schema identifies the one or more fields in each of the typed data structures that are included in the template.

8. The system of claim 7, wherein the template building module is further configured to:
   mark one or more fields in the template pruning schema that correspond to the one or more fields in each of the typed data structures included in the template, wherein each marked field in the template pruning schema indicates that a corresponding field in the typed data structure receives input data included in the HTML document.

9. The system of claim 7, wherein the typed data structure is a protocol buffer message.

10. The system of claim 7, further comprising:
    a pruning generator configured to generate the pruning schema specific to the typed data structure from a typed data structure declaration file associated with the typed data structure.

11. The system of claim 10, wherein the data structure declaration file is a protocol buffer declaration file.

12. A computer-implemented method for reducing an amount of data transmitted over a network, comprising:
    accessing input data using a typed data structure message, wherein the typed data structure message is associated with a typed data structure included in a template, the typed data structure including one or more typed data fields;
    retrieving a template pruning schema, wherein the template pruning schema is generated from a pruning schema specific to the typed data structure included in the template and wherein the template pruning schema identifies a subset of the input data that is assigned to the one or more typed data fields of the typed data structure in the template;
    pruning the input data using the template pruning schema to obtain a pruned input data, wherein the pruned input data includes the subset of the input data that is identified in the template pruning schema;
    rendering an HTML document using the pruned input data and a binary template object generated from the template; and
    transmitting the pruned input data over the network.

13. The computer-implemented method of claim 12, further comprising receiving a request message for the input data.

14. The computer-implemented method of claim 13, wherein the request message is for updating a webpage that includes the template.

15. The computer-implemented method of claim 12, wherein the typed data structure message is a protocol buffer message.

16. The computer-implemented method of claim 12, wherein the typed data structure declaration file is a protocol buffer declaration file.

17. The computer-implemented method of claim 12, wherein the transmitting further comprises:
    generating a response message, the response message including the pruned input data for updating a webpage.

18. A system for reducing an amount of data transmitted over a network, comprising:
    one or more memory storage devices configured to:

store a template pruning schema, wherein the template pruning schema is generated from a pruning schema specific to a typed data structure included in a template and wherein the template pruning schema identifies a subset of the input data that is assigned to the one or more typed data fields of the typed data structure in the template; and store the input data;

a pruner configured to:

access the template pruning schema and the input data, wherein the input data is accessed using a typed data structure message associated with the typed data structure included in the template; and prune the input data using the template pruning schema into a pruned input data, wherein the pruned input data includes the subset of the input data that is identified in the template pruning schema, wherein an HTML document is rendered using the pruned input data and a binary template object generated from the template, and transmitted for display over the network.

19. The system of claim 18, wherein the communication interface is further configured to:

receive a request message for the input data, the request message being for updating a webpage.

20. The system of claim 19, wherein the request message includes template pruning schema.

21. The system of claim 18, wherein the typed data structure message is a protocol buffer message.

22. The system of claim 18, wherein the pruning schema is generated from a protocol buffer declaration file.

23. The system of claim 18, wherein the pruner is located on a web server.

24. The system of claim 18, wherein the pruner is located on a computing device that includes a data repository.

* * * * *